UNITED STATES PATENT OFFICE.

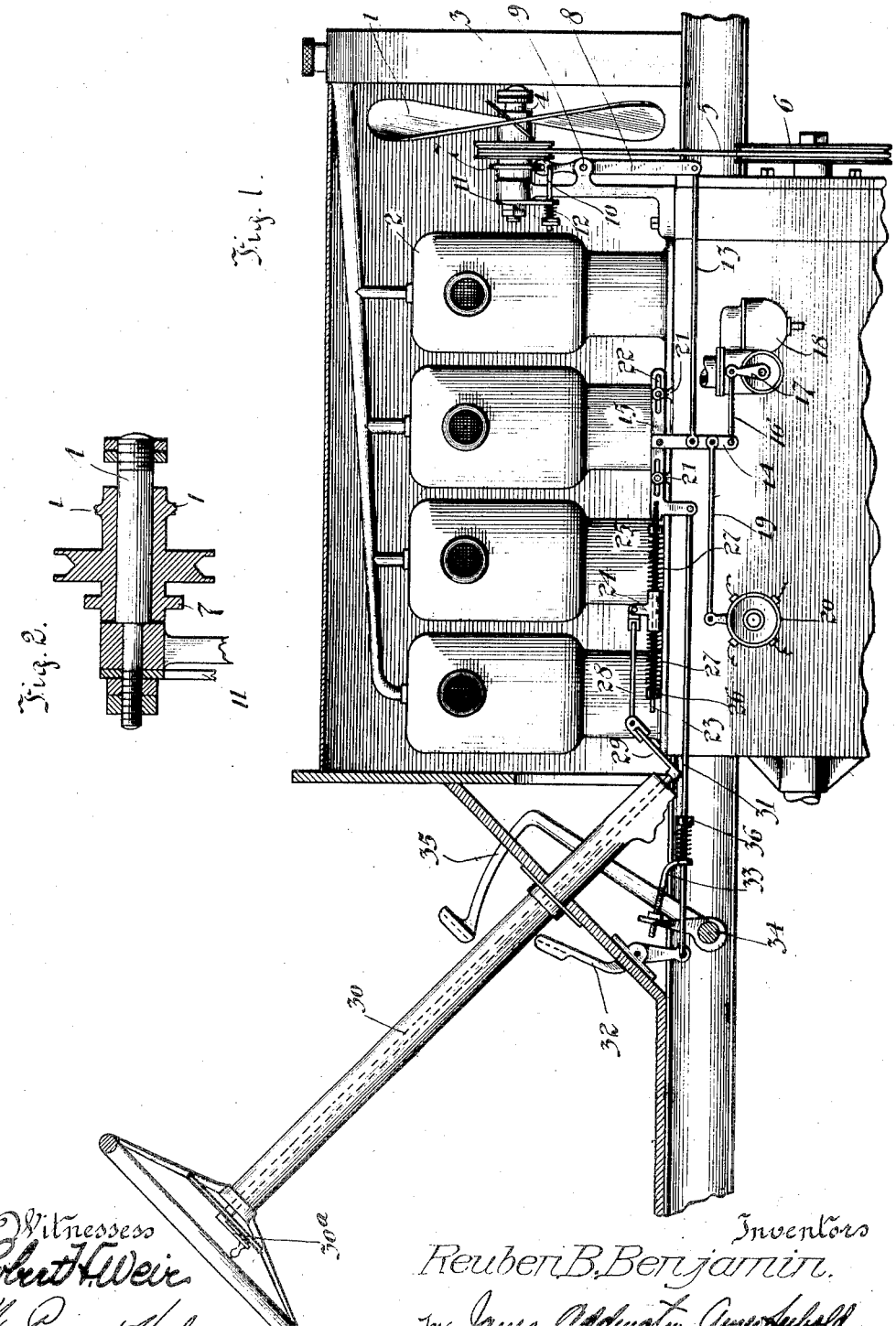

REUBEN B. BENJAMIN, OF CHICAGO, ILLINOIS, ASSIGNOR TO BENJAMIN ELECTRIC MFG. COMPANY, OF CHICAGO, ILLINOIS, A CORPORATION OF ILLINOIS.

EXPLOSIVE-ENGINE GOVERNOR.

1,068,097.   Specification of Letters Patent.   Patented July 22, 1913.

Application filed October 1, 1912. Serial No. 723,421.

*To all whom it may concern:*

Be it known that I, REUBEN B. BENJAMIN, a citizen of the United States, residing at Chicago, in the county of Cook and State of Illinois, have invented new and useful Improvements in Explosive-Engine Governors, of which the following is a full, clear, concise, and exact description, reference being had to the accompanying drawing, forming a part of this specification.

My invention relates to improvements in means for governing and maintaining the speed of power-supplying devices, and particularly of explosive or gasolene engines. It is particularly adaptable for controlling the speed of explosive engines driving vehicles and the like, and to this end I provide a means whereby the fan which draws the air across the radiator of an explosive engine will also act as a governor for maintaining constant the speed at which the engine is set to run, irrespective of the load imposed thereon. This is particularly advantageous for use on explosive engine driven vehicles where it is desired to maintain substantially constant the speed at which the vehicle is traveling irrespective of the character of the road over which the vehicle is being driven.

For the purpose of disclosing my invention, I have illustrated in the accompanying drawings one embodiment thereof.

In said drawings—Figure 1 is a side elevation, with a part of the head removed, of an explosive engine having one embodiment of my controlling means thereon; and Fig. 2 is a sectional view of the supporting shaft for the fan.

In the embodiment of the invention illustrated, the fan 1 of the automobile engine 2 which is provided for drawing air into the radiator 3 is mounted to move longitudinally upon the shaft 4, upon which it also rotates. This fan is driven by the usual belt 5 from a belt wheel 6 operated from the engine, and the hub of the fan is provided with an annular flange 7 adapted to engage between the bifurcated ends of a lever 8 pivoted at 9 to the support for the fan. A link 10 is connected to the upper end of the lever 8 and has interposed between its rear end and a stop member 11 on the support for the fan a coiled spring which tends to keep the fan in its innermost position on the shaft 4. The lever 8 is connected by a rod 13 with a secondary lever 14 pivotally mounted upon the sliding bar 15 and connected at its lower end by a link 16 with the throttle control arm 17 of the carbureter 18. This lever 14 is also connected by a link 19 with the timer or spark control 20 of the engine.

The sliding bar 15 is suitably mounted on the frame of the engine and its held in position upon a pair of posts 21 which are provided with laterally extending studs arranged to extend through the slots 22 in the support. The rear end of the bar is provided with an extension rod 23 on which is mounted a connecting member 24, which member has interposed between it and collars 25 and 26 suitable coiled springs 27 to resiliently connect the member 24 with the rod, so that any movement of the member 24 will be resiliently transmitted to the sliding bar 15. The connecting member 24 is connected by a link 28 with the crank 29 on the end of the throttle rod 30, which is adapted to pass up through the steering handle of the machine to the throttle lever 30ª. The support 15 is also connected by a rod 31 with the accelerator foot lever 32 of the engine and passes through a connecting member 33 mounted upon the clutch shaft 34 of the vehicle, this shaft being controlled by the usual clutch foot member 35. A coiled spring is interposed between the member 33 and a collar 36 on the rod, so that when the member 33 moves forward with the clutch it also moves the sliding bar 15 forward.

By the above disclosed means I am enabled to provide a controlling mechanism by which the carbureter of the engine may be set to feed a definite amount of fuel to the engine to maintain the speed of the engine at a predetermined point. At the same time, in event of a variation of the load on the engine, say for instance the vehicle going up or down hill, the tendency of the engine to speed up or slow down will be prevented by the governing fan, which, in event the load is increased and the engine tends to slow down, will open the throttle of the carbureter, admitting a larger amount of fuel to increase the speed of the engine.

Likewise, if the engine tends to speed up, the governing fan will cause the throttle of the carbureter to close, thereby decreasing the fuel supply, and correspondingly decreasing the speed of the engine.

In operation, we will assume that the driver of the engine wishes to operate his engine at, say, a speed of twenty-five miles an hour under normal conditions. He moves his throttle control lever on the steering wheel to a point where the throttle of the carbureter will be open to admit a supply of fuel to the engine to maintain this speed. In event the speed of the engine increases, the speed of the fan 1 will likewise increase and the tendency of the fan will be to move forward on its shaft 4, due to the increased air pressure on its blades. This forward movement will operate the lever 8 and through the link 13 the lever 14, to partially close the throttle of the carbureter, decreasing the fuel supply and thereby slowing the engine down. At the same time that the fuel supply is decreased the timer 20 will be operated to slightly advance the spark. In event the engine slows down to too great an extent, the decreased resistance of the fan 1 will permit it to move rearwardly on the shaft 4 under the influence of the coiled spring 12, thereby opening the throttle and retarding the spark. The carbureter throttle may not only be operated from the handle on the steering wheel, but likewise may be controlled from the accelerator foot lever 32 by moving this lever backward or forward.

The connection between the sliding bar 15 and the clutch controlling foot lever 35 permits the closing of the throttle when the clutch is released. It will be seen that when the foot lever 35 is moved forward it moves the member 33 and through this member the rod 31 and the sliding bar 15 forward. With this movement the stationary or fulcrum point of the lever 14 is at the pivotal connection between the rod 13 and the lever 14; therefore the moving forward of the upper end of the lever 14 will move rearwardly the lower end and cause the throttle to be closed.

Having thus described my invention, what I claim as new and desire to secure by Letters Patent, is:

1. A speed governor, comprising a rotary fan arranged to be driven at a speed corresponding to the speed of the motor which it is intended to govern and having a movable member, the movement of said member being caused by the variations in air pressure upon the blades of the fan due to the variable speeds at which the fan is driven.

2. A speed governor, comprising a rotary fan arranged to be driven at a speed corresponding to the speed of the motor to be governed and having movement for controlling the speed caused by the variations in air pressure upon the blades of the fan due to the variations in speed at which the fan is rotated.

3. A speed governor comprising a rotary fan arranged to be driven at a speed corresponding to the speed at which the motor to be controlled is operated and having an axial movement on its shaft for controlling the speed of the motor, said movement being caused by the variations in air pressure upon the blades of the fan, due to the variations in speed at which the fan is rotated.

4. In a governor, the combination with a rotary fan arranged to be driven at a speed corresponding to the speed of the motor which it controls, and having an axial movement on its shaft, a speed controlling mechanism connected with said shaft and operated by said axial movement, said axial movement being caused by the variations in air pressure upon the blades of the fan due to the variable speeds at which the fan is rotated.

5. The combination with a fuel controller of an explosive engine, of manually operative means for setting said controller to deliver a definite supply of fuel to obtain a definite speed, and a rotary fan operative at a speed corresponding to the speed of the motor and having a movable member connected to the fuel supply controller, said member being caused to move by the variations in air pressure upon the fan blades due to the variations in speed at which the fan is rotated, whereby the speed of the motor will be automatically maintained constant after it has once been manually predetermined.

6. The combination with a fuel controller of an explosive engine, of a lever connected thereto and pivoted to a movable member, manually operative means for moving said member to change the pivot point of said lever, a rotary fan operated at a speed corresponding to the speed of the motor and having an axial movement on its shaft, pivotally connected with said pivoted lever, said fan being caused to axially move on its shaft by the variations in air pressure upon its blades due to the variable speeds at which the fan is rotated.

7. The combination of a fuel controller of an explosive engine and a spark timer, of a rotary fan operated at a speed corresponding to the speed of the motor and having an axial movement on its shaft, said fan being connected with the fuel controller and the spark timer, the axial movement of the fan on its shaft being caused by the variations in air pressure on its blades due to the variable speeds at which the fan is rotated.

8. The combination with a fuel controller of an explosive engine, of an automatic governor therefor comprising a rotary fan having an axial movement on its shaft, said movement being caused by the variation in air pressure upon its blades, due to the variable speeds at which the fan is rotated.

9. The combination with a fuel controller of an automobile, of means for automatically operating said controller for maintaining the speed constant under varying load conditions, and means for automatically operating said controller to cut off the fuel supply when the clutch between the engine and the mechanism driven thereby is released.

10. The combination with a fuel controller of an explosive engine of means for manually setting said controller to feed a definite supply of fuel to the engine for a predetermined speed, means for automatically operating said controller to vary the supply of fuel fed to the engine in accordance with the load imposed thereon, and means for automatically operating said controller to shut off the supply of fuel to the motor when the clutch connecting the motor with the mechanism to be driven is disconnected.

11. The combination of a spark timer of an explosive engine with a rotary fan operated at a speed corresponding to the speed of the motor of the engine and having an axial movement on its shaft, said fan being connected with said spark timer, the axial movement of the fan on its shaft being caused by the variations in air pressure on its blades due to the variable speeds at which the fan is rotated.

In witness whereof, I have hereunto subscribed my name in the presence of two witnesses.

REUBEN B. BENJAMIN.

Witnesses:
E. R. KING,
W. PERRY HALM.